Dec. 5, 1967

T. A. RAUGUST 3,356,137

METHOD AND APPARATUS FOR OBTAINING A FLUID
SAMPLE FROM AN EARTH FORMATION

Filed July 30, 1965

INVENTOR.
THEODORE A. RAUGUST

BY John O. Evans, Jr.

ATTORNEY

FIG. 2.

INVENTOR.
THEODORE A. RAUGUST
BY John O. Evans, Jr.
ATTORNEY

FIG. 8.

INVENTOR.
THEODORE A. RAUGUST
BY John O. Evans, Jr.
ATTORNEY

United States Patent Office 3,356,137
Patented Dec. 5, 1967

3,356,137
METHOD AND APPARATUS FOR OBTAINING A FLUID SAMPLE FROM AN EARTH FORMATION
Theodore A. Raugust, Edmonton, Alberta, Canada, assignor to Borg-Warner Corporation, Chicago, Ill., a corporation of Illinois
Filed July 30, 1965, Ser. No. 475,977
7 Claims. (Cl. 166—3)

ABSTRACT OF THE DISCLOSURE

A method for obtaining a fluid sample from an earth formation traversed by a well bore and a pipe by flowing a sample of fluid from the formation into the pipe, isolating it in the pipe, forcing another fluid into the pipe below the sample from the annulus between the pipe and the bore, and moving the isolated sample upward in the pipe for collection. Also, apparatus for accomplishing this, including a packer for sealing off the annulus above the formation, a valve for admitting a sample into the pipe, and a reverse-circulating valve for displacing the sample from the pipe.

---

This invention relates to a method and apparatus for obtaining a fluid sample from an earth formation. The terms "fluid sample" is used herein in a broad sense; it includes liquid samples, gas samples, and samples of liquid and gas mixtures.

As oil wells and the like are being drilled, it is common practice to sample the formations being penetrated in order to determine potential oil or gas production capacities. Samples are taken both of the solid material being drilled through, in the form of cores, and of fluid material flowing into the well bore from adjacent earth formations. It is the latter with which the present invention is concerned. Heretofore, available equipment and procedures have required the fluid sample to be collected in the drill pipe, the pipe raised above the derrick floor, and the pipe drained, usually a stand of three lengths at a time, after making the necessary hose, gauge, and valve connections. Because of the frequent presence of high pressure gases and flammable fluids, the method of draining the pipe while it is in the derrick has presented many safety hazards, particularly when working at night with limited visibility, and has often resulted in unnecessarily long delays. It is also often desired that the information on fluid samples and well production potential be available to a limited number only of personnel. Existing tools and equipment are inadequate in this respect too, because of the number of operators required during the sample-taking, the time involved, and the inconvenient method of draining the stands of pipe in the derrick.

Accordingly, it is a primary object of the present invention to provide a method and apparatus for obtaining a fluid sample from an oil well formation safely, and with efficiency and security.

Another object of the invention is to provide a method and tools which can easily be adapted for any desired sample size.

An additional object is to provide for the removal of an uncontaminated formation sample isolated from fluid or cushioning water above, and from drilling mud below the sample; and to be able to continue the flow of mud to flush out all traces of formation fluid from the tools.

Still another object of the invention is to provide for removal of a formation fluid sample at the surface while the pipe is still in the hole, and without interfering with the usual downhole testing requirements such as pressure readings; and also being able, if required, to run other equipment through the drill pipe.

Briefly, the invention involves a method for obtaining a sample of fluid from an earth formation traversed by a borehole extending from the surface of the earth to the formation, which includes: establishing communication with the formation from the surface of the earth through a zone in the borehole spaced from and isolated from the wall of the borehole, thus forming an annular space between the zone and the well; isolating the formation from the remainder of the borehole; establishing communication between the formation and the zone, thereby allowing flow of a sample of fluid from the formation into the zone; barring the formation from the zone; establishing communication between the annular space and a location in the zone between the sample and the point in the zone at which the formation is barred from the zone; isolating the sample from fluid in the zone; applying pressure to the fluid in the annular space, communicating with the isolated sample in the zone to translate the sample to the surface of the earth; and collecting the sample.

The invention also involves apparatus for obtaining a fluid sample from an earth formation traversed by a borehole extending from the surface of the earth to the formation, which includes: a pipe extending into the borehole from the surface of the earth to a point adjacent to the formation; packer means for packing off between the pipe and the borehole above the formation, the pipe having an opening below the packer means for communication with the formation; first valve means for controlling flow of fluid into the pipe through the opening; a plug in the pipe above the first valve means and movable upward through the pipe in response to fluid force exerted on the plug from below, the plug having seal means for sealing it against the inner wall of the pipe as it moves through it; means for conducting fluid in the pipe from below the plug into the pipe above the plug; valve controlled means for conducting fluid from outside of the pipe and above the packer into the pipe below the plug and above the first valve means to urge the plug to move upward through the pipe; and means for withdrawing fluid in the pipe above the plug.

The invention will be described with greater particularity in the following detailed description taken with the accompanying drawings.

In the drawings.

Like reference characters in the various figures of the drawings and in the following description designate corresponding parts.

Figure 1:
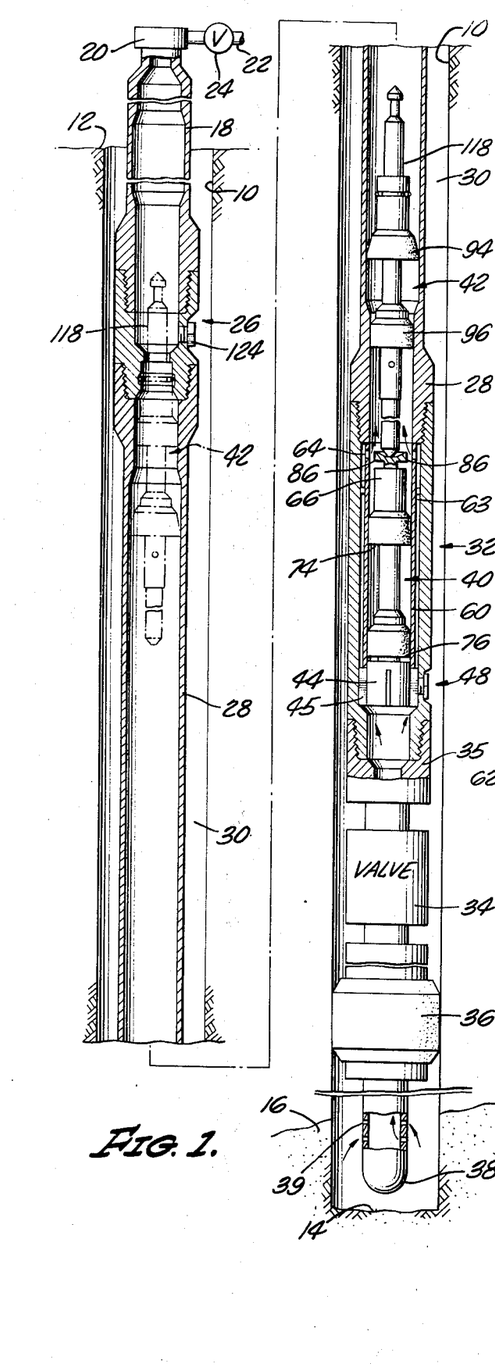
FIG. 1 is a longitudinal view, partly in section, of one form of the apparatus in accordance with the invention showing the various components in their initial positions in a well prior to testing and sampling, and showing in phantom view the top plug in its upper position.

Referring to FIG. 1 there is shown an apparatus according to the present invention in a borehole 10 extending from the surface of the earth 12 to the bottom 14 of the hole into a formation 16. Drill pipe 18, capped by a cap 20 with its outlet conduit 22 and top valve 24, extends into the borehole 10 to the arresting means or landing sub 26, to which is connected additional drill pipe 28 forming an annular space or annulus 30 between the drill pipe and the borehole 10. To the bottom of pipe 28 is connected a series of components including a reverse-circulating sub 32, a top sub 35, a first or main valve 34 for barring flow of fluid from formation 16 to drill pipe 28, a packer 36, and a perforated bull nose 38 containing first openings or perforations 39. Inside of the reverse-circulating sub 32 is a first plug 40, above which is a second plug 42, shown also in phantom in its upper position. The tubular members of the foregoing assembly form a zone in the borehole spaced from the wall of the borehole and extending from the surface of the earth into communication with the formation 16.

The valve 34 and the packer 36 are conventional components, well known to those skilled in the art of formation testing; and are operated conventionally by raising, lowering, or rotating the drill pipe 18 and 28.

Figure 2:
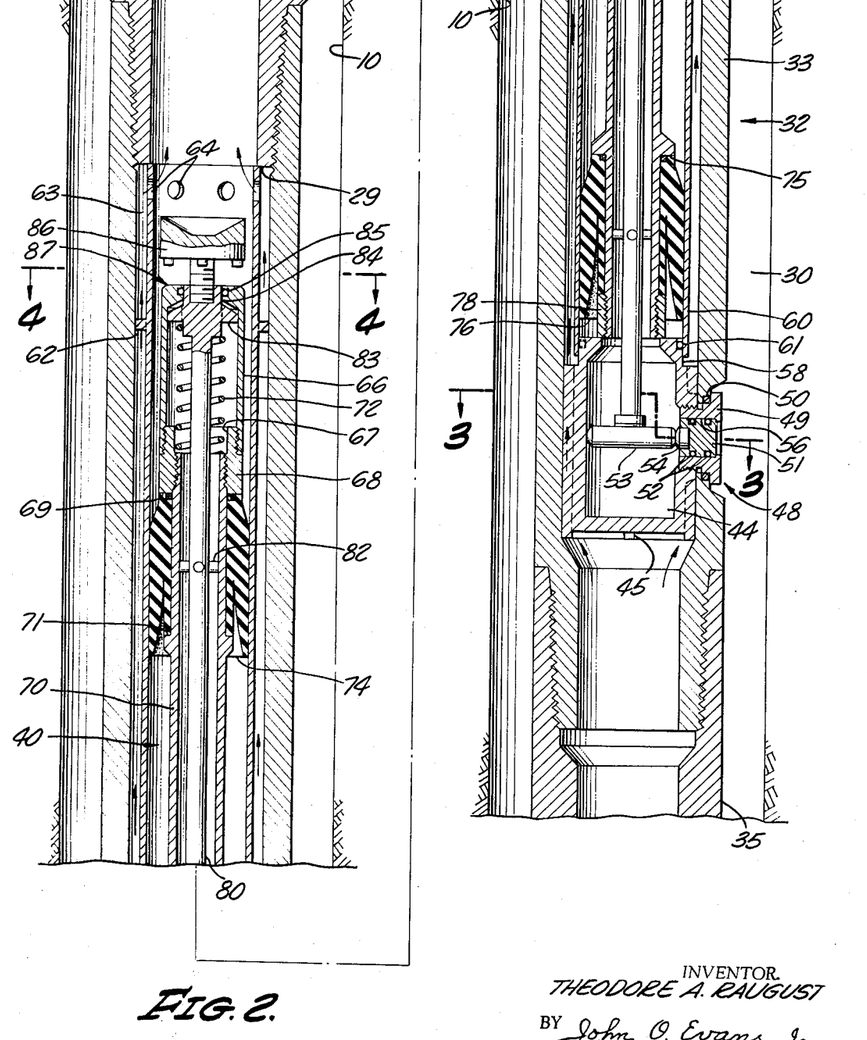
FIG. 2 is a longitudinal sectional view of a portion of a well showing the bottom plug assembly on an enlarged scale, and showing also the reverse-circulating sub.
Figure 3:
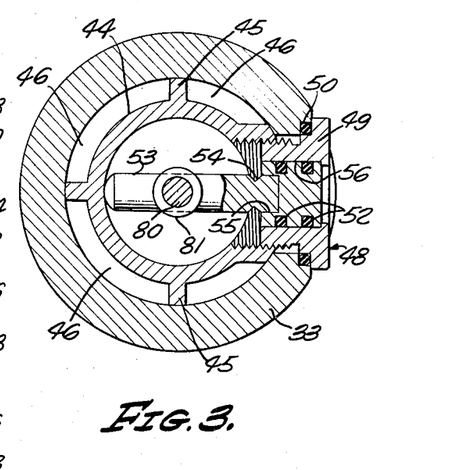
FIG. 3 is an enlarged sectional view through the lower end of the bottom plug assembly and the reverse-circulating valve taken on the line 3—3 of FIG. 2, looking in the direction of the arrows.
Figure 4:
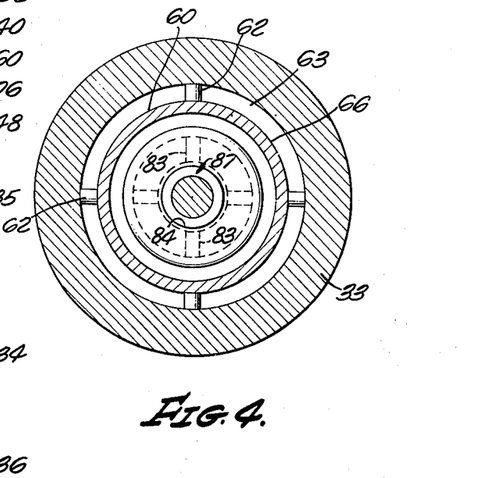
FIG. 4 is an enlarged sectional view through the upper end of the bottom plug assembly, taken on the line 4—4 of FIG. 2, looking in the direction of the arrows.

Referring to FIGS. 2, 3 and 4, first plug 40 is shown inside of the reverse-circulating sub 32, which is screwed to drill pipe 28 and the top sub 35. The reverse-circulating sub 32 has a body 33, a splined cup 44 centered in the sub 33 by means of longitudinal splines 45, providing flow channels 46 between the body 33 and the cup 44. The reverse-circulating valve 48 provides access from the annulus 30 into the splined cup, holding the latter in place by means of a flanged sleeve 49 screwed into it through the reverse-circulating sub body 33 and sealed against the latter by means of an O-ring 50, and against the valve plug 51, which seals against the valve opening 56 of the flanged sleeve by means of O-rings 52. The valve plug is held in place by a shear pin 53, which has a notch 54 and is pressed into a hole 55 in the valve plug. To the top flange 58 of the splined cup 44 is fitted a by-pass sleeve 60, sealed to the flange by means of the flange seal, and centered inside reverse-circulating sub body 33 by means of centering pins 62, thus providing a fluid by-pass space 63. The by-pass sleeve 60 is restrained from upward movement by abutment against the bottom end 29 of drill pipe 28, and by-pass holes 64 provide communication from the fluid by-pass space 63 into the drill pipe 28.

The first plug 40 has a thimble 66, into which is screwed a nipple 68, and into the latter a mandrel 70, forming a recess 67 for the lower support of a spring 72 and a shoulder 69 against which abuts a seal 74, the lower end of the latter abutting a shoulder 71 of the mandrel 70. Against the lower shoulder 75 of the mandrel 70 abuts a second seal 76, held in place by a sleeve 78. Through the inside of the mandrel is slidably inserted a plunger 80, its bottom end terminating in a head 81, resting against the shear pin 53, and centered inside the mandrel by means of guide pins 82. The top end of the plunger 70 terminates in a valve guide 83 and a neck 84, sealing by means of a seal 85 inside of the thimble 66, forming a bottom plug valve 87 normally closed by the compressing action of the spring 72 against the bottom of the valve guide. Into the top of the plunger 80 is screwed an actuating anvil 86.

Figure 5:
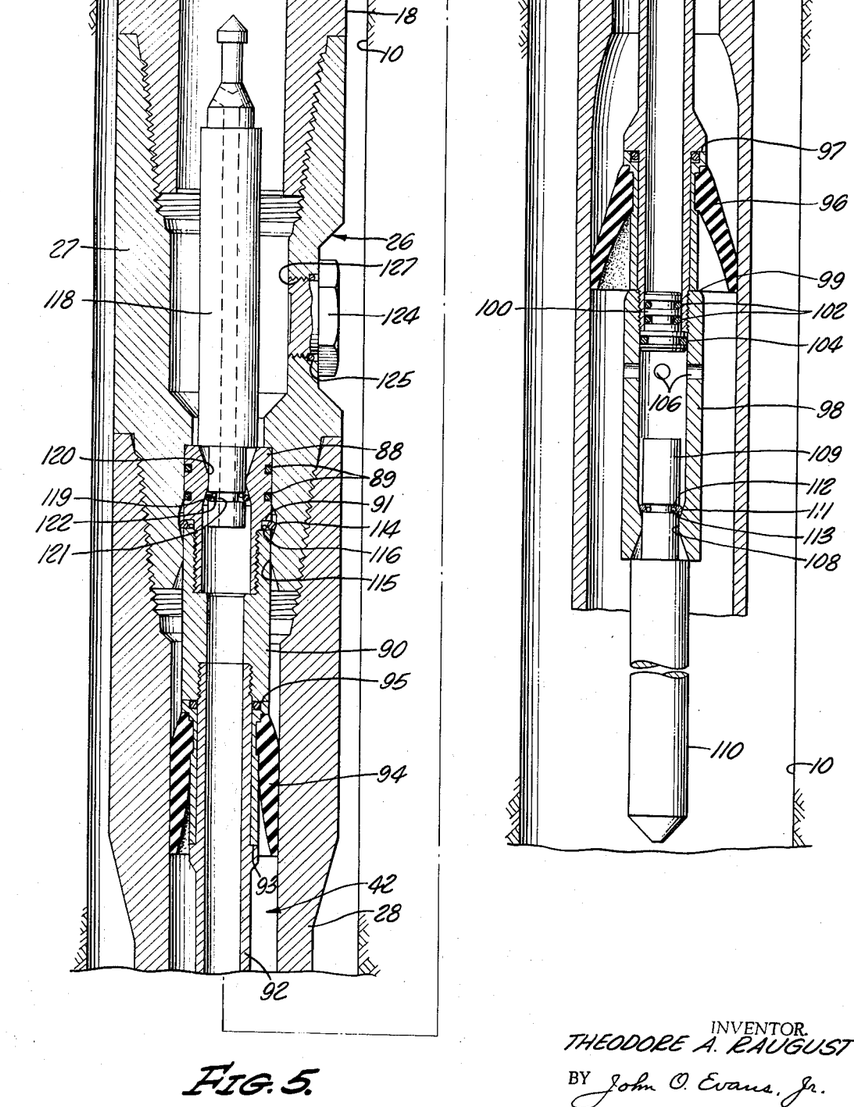
FIG. 5 is an enlarged longitudinal sectional view of another portion of the well showing the top plug in the position of engagement with the landing sub, as in the phantom view of FIG. 1.

Referring to FIG. 5, the second plug 42 is shown in its upper position, as illustrated in phantom in FIG. 1, in engagement with the landing sub 26. This plug consists of a lifting collar 88 onto which is screwed a connecting sleeve 90, forming a groove 91 between the two parts. A mandrel 92 is screwed into the sleeve, the seal 94 being held between the shoulder 93 and the bottom end 95 of the connecting sleeve 90. A second seal 96 is held between the second shoulder 97 of mandrel 92 and the top end 99 of an actuating sleeve 98, which is screwed onto the bottom of the mandrel. A valve plug 100 is sealed against the inside of the mandrel 92 by means of ring seals 102 and against the inside of the actuating sleeve 98 by means of a ring seal 104, the seals 102 and 104 also providing friction to keep the valve plug 100 above the inlet ports 106. The inside of the lower end of the sleeve 98 has a shoulder 108 providing a constriction through which passes the neck 109 of a pump-out bar 110, the latter being restrained from falling by the expansion of a snap-ring 111 behind the shoulder 108, the snap-ring 111 being retained in groove 112 of the pump-out bar 110, and centered by means of an O-ring 113. The O-rings 89 provide a seal between the sub body 27 and the lifting collar 88, the latter being retained by the expansion of a snap-ring 114 in the groove 91 above the internal shoulder 115, the snap-ring 114 being centered in the groove by means of an O-ring 116. A fishing neck 118 is retained in the lifting collar 88 by the expansion of a snap-ring 119 behind a shoulder 120. The snap-ring is centered in a groove 121 of the fishing neck by means of an O-ring 122. A plug 124, sealed by an O-ring 125, plugs the outlet 127 of the landing sub 26.

Figure 6:
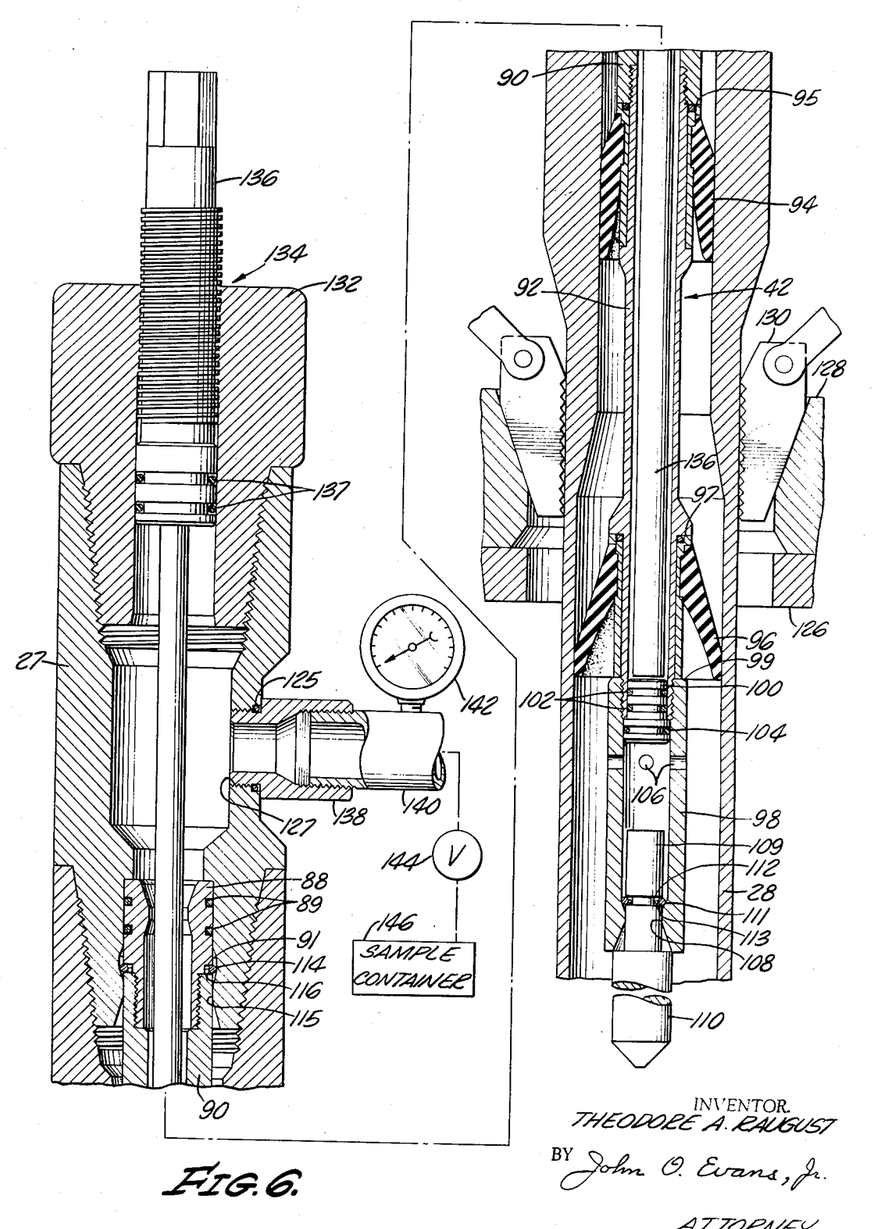
FIG. 6 is an enlarged longitudinal sectional view of the top plug assembly engaged in the landing sub as in FIG. 5, but after raising the pipe and tools until the landing sub is exposed at the surface, showing the pipe-supporting slips engaged and the retrieving sub and bleed-off fittings installed.

In FIG. 6 is shown a partial view of a rotary table 126 with its slip bowl 128 and slips 130 supporting the drill pipe 28. A plug 132 of a retrieving assembly 134 is screwed into the landing sub body 27, the knock-out bar 136 being sealed against the inside of the plug by means of O-ring seals 137. An outlet nipple 138 is connected to the outlet 127 of the sub 27, and to a flow line 140, with its pressure gauge 142 and valve 144, leading to a sample container 146.

Figure 7:
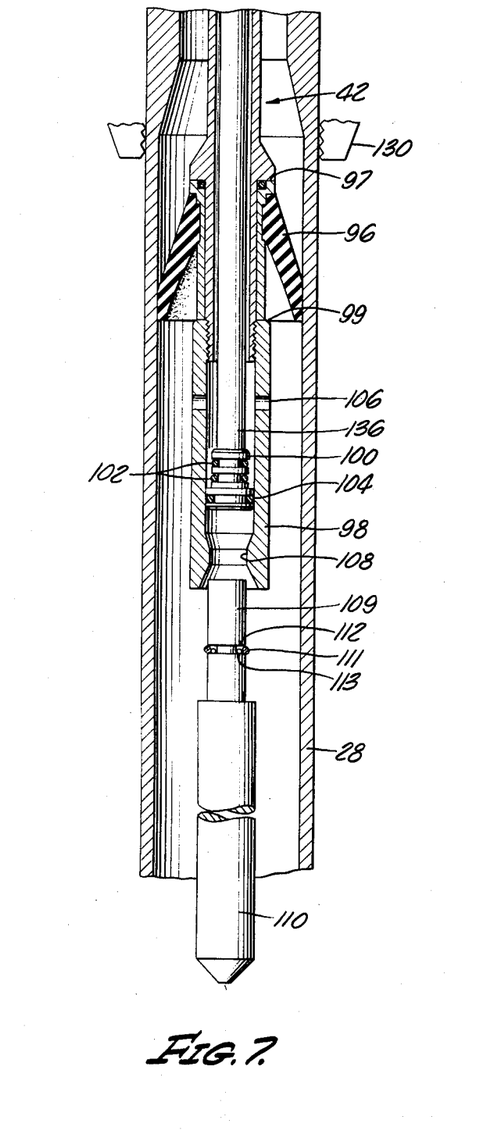
FIG. 7 is a fragmentary longitudinal sectional view of the lower end of the top plug assembly as in FIG. 6, showing the top plug valve opened and the pump-out bar pushed out and falling free of the assembly.
Figure 8:
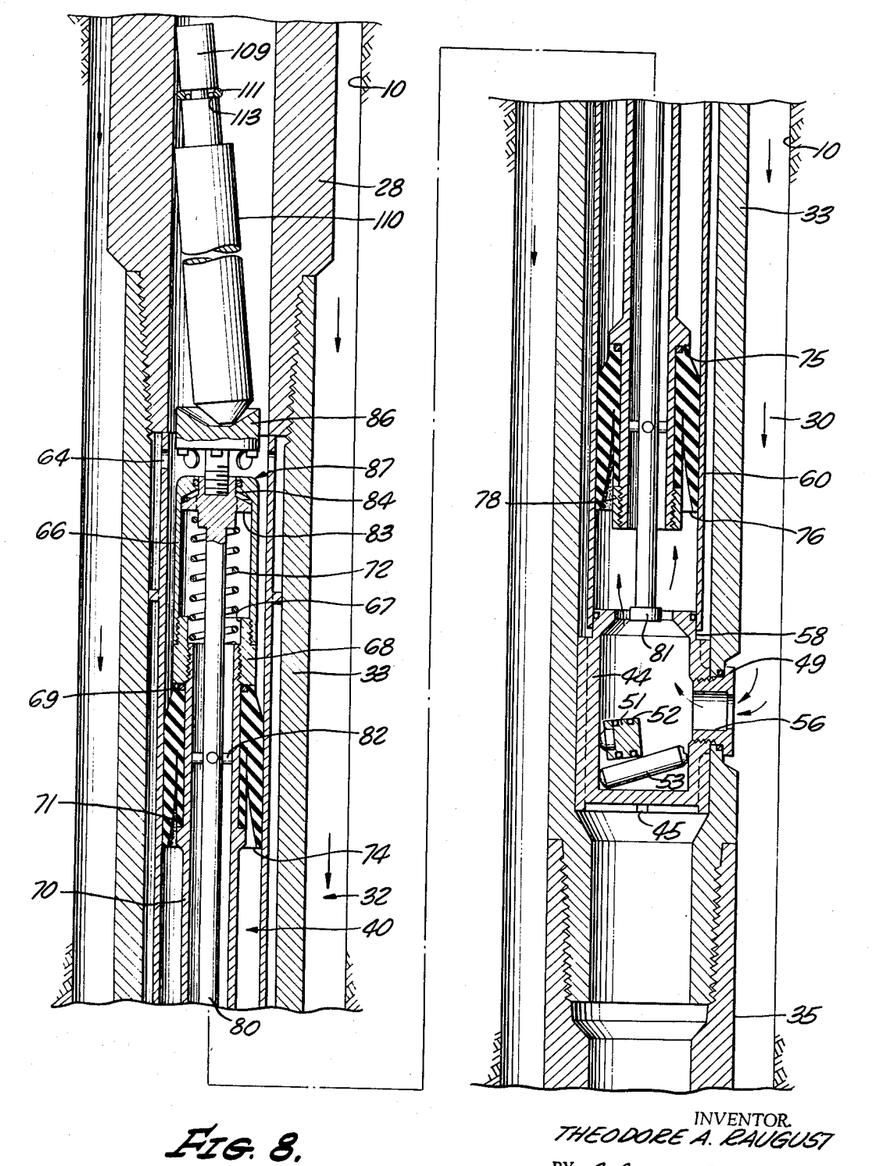
FIG. 8 is a longitudinal sectional view of the bottom plug assembly immediately after being struck by the falling pump-out bar, showing the reverse-circulating sub valve, the shear pin broken, the valve open, and the bottom plug beginning to move upward.
Figure 9:
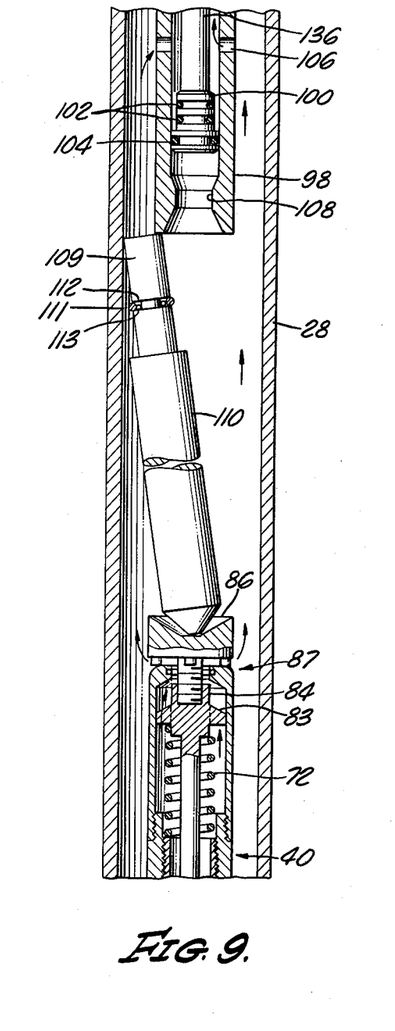
FIG. 9 is a longitudinal sectional view of the lower end of the top plug and the upper end of the bottom plug after it has traveled upward, pushing the pump-out bar ahead, the latter striking the bottom of the top plug assembly, the resultant force opening the valve in the bottom plug.

The apparatus shown in FIGS. 7, 8 and 9 has already been described with reference to FIGS. 1, 2, 3, 4, 5 and 6.

Based on a typical procedure, a brief description of the operation of the foregoing apparatus is presented, with reference to the several figures. When a borehole or well bore 10 has been drilled into a formation 16 from which it is desired to obtain a fluid sample, formation testing apparatus is lowered into the well bore 10. This includes a perforated bull nose 38 located in the area of the formation 16, a packer 36 for sealing off the formation 16 from the remainder of the well bore 10, a main or first valve 34 for controlling or barring flow through the drill pipe 28; and above the main valve is attached the reverse-circulating sub 32, inside of which is inserted the first or bottom plug assembly 40, with the second or top plug assembly 42 immediately above it. To the top of the reverse-circulating sub 32 are attached lengths of drill pipe 28 sufficient to provide the volume of fluid sample desired. At the top of the drill pipe 28, the arresting means or landing sub 26 is screwed on, and additional lengths of drill pipe 18 added to reach above the earth's surface 12, where surface equipment is added, including a cap 20, an outlet conduit 22 and a valve 24, as shown in FIG. 1. If cushioning water is desired above the top plug 42, it may be added through the valve 24. With the apparatus in place, the packer 36 is set, isolating the formation 16 from the remainder of the well bore 10, the main valve 34 is opened, allowing fluid from the formation 16 to enter the bull nose 38 through the perforations 39, flow up inside the packer 36 and valve 34, and into the reverse-circulating sub 32, flowing up around the splined cup 44 through the space 46 and around the by-pass sleeve 60 through the space 63 and by-pass holes 64, coming back into the drill pipe below the seal 96 of the top plug 42, as illustrated in FIGS. 2, 3, and 4, and above the seal 74 of the bottom plug 40, the fluid pressure urging the second plug 42 upward to its position in sealing engagement with the landing sub 26, as seen in FIG. 5 and in the phantom view of FIG. 1. In the event that there is insufficient formation pressure to force the top plug 42 all the way up, a fishing tool (not shown) may be lowered into the pipe 18 and 28 to engage the fishing neck 118 and raise the top plug 42 into its upper position. The pipe 28 having been filled with fluid sample below the top plug 42, the main valve 34 is closed, the packer 36 released, and the apparatus raised in the borehole 10, the top lengths of pipe 18 being removed until the landing sub 26 is exposed above the earth's surface 12 and the rotary table 126, the remainder of the pipe 28 being supported by a set of slips 130 in the slip bowl 128 of the rotary table 126 as shown in FIG. 6. The fishing neck 118 is removed, the retrieving assembly 134 screwed into the top of the landing sub body 27, the blanking plug 124 removed and in its place the outlet nipple 138 inserted, to which is connected the flow line 140, with its gauge 142 and valve 144, leading to a suitable sample container 146. The knock-out bar 136 is then screwed through the plug 132 of the retrieving assembly 134 until the valve plug 100 is pushed down below the inlet ports 106, as illustrated in FIG. 7, thus opening a passage for the flow of the fluid sample through the inlet ports 106 and through the inside of the top plug 42 and landing sub body 27 through the flow line 140 to the sample container 146. As shown in FIGS. 7 and 8, on screwing the knock-out bar 136 down farther, the pump-out bar 110 is ejected from the actuating sleeve 98 of the top plug 42, the pump-out bar 110 falling and striking the anvil 86 of the bottom plug 40, the blow resulting in a momentary downward translation of the plunger 80, its head 81 striking the pin 53 to break it off at its notch 54, the energy of the compressed spring 72 then returning the plunger 80 to its normal position, sealing off fluid flow through the valve 87 of the bottom plug 40. The shear pin 53 being knocked out of the way, the valve plug 51 is free to be forced inward by fluid pressure applied to drilling mud in the annulus 30, the fluid flowing in from the annulus 30 through the valve opening 56 into the splined cup 44 on into the by-pass sleeve 60 below the sealing rubber 76 of the bottom plug 40, the pressure of the drilling mud forcing the latter upward into a translated position as shown in FIG. 8, and into its final position as shown in FIG. 9, pushing the fluid sample and the pump-out bar 110 ahead, the sample flowing into a container 146 and the pump-out bar 110 hitting the bottom sleeve 98 of the top plug 42, the resultant force pushing the anvil 86 downward, opening valve 87 of the bottom plug 40, allowing flow of drilling mud through the latter to flush out all traces of fluid sample from the apparatus prior to its removal and disassembly.

Each of the plugs 40 and 42 has a pair of longitudinally spaced seals, 74 and 76, and 94 and 96, respectively, the second of each pair assuring a continuous seal against the inside of the pipe 18 and 28 in the event the other fails to seal in passing through joints and restrictions. Alternatively, each of the plugs may have but a single seal, or each plug may have more than two seals.

Alternatively, the above typical procedure may be varied by the use of only the first or bottom plug 40, in which case the top plug 42, the fishing neck 118, and the landing sub 26 need not be used. Referring to FIG. 1, when a borehole 10 has been drilled into a formation 16 from which it is desired to obtain a fluid sample, formation testing apparatus is lowered into the well bore 10. This includes a perforated bull nose 38 located in the area of the formation 16, a packer 36 for sealing off the formation 16 from the remainder of the well bore 10, a first or main valve 34 for controlling or barring flow into the drill pipe 28; above valve 34 is attached the reverse-circulating sub 32, inside of which is inserted the plug 40. To the top of the reverse-circulating sub 32 are attached lengths of drill pipe 28 sufficient to reach above the earth's surface 12 where the string of pipe 28 is supported at the rotary table 126 by the slips 130, where surface equipment is added, including a cap 20, valve 24, and outlet conduit 22 leading to a suitable container (not shown). With the apparatus in place, the packer 36 is set, isolating the formation 16 from the remainder of the well bore 10, the main valve 34 is opened, allowing fluid from the formation 16 to enter the bull nose 38 through the perforations 39, flow up inside the packer 36 and valve 34, and into the reverse-circulating sub 32, flowing up around the splined cup 44 through the space 46 and around the by-pass sleeve 60 through the space 63 and the by-pass holes 64, coming back into the drill pipe 28 above the seal 74 of the plug 40, as illustrated in FIGS. 2, 3 and 4, until sufficient fluid sample is in the pipe 28. Then the main drill pipe valve 34 is closed barring further flow from formation 16, and a pump-out bar 110 dropped through the drill pipe 28 to strike the anvil 86 of the plug 40, the blow resulting in a momentary downward translation of the plunger 80, its head 81 striking the pin 53 to break it off at its notch 54, the energy of the compressed spring 72 then returning the plunger 80 to its normal position sealing off fluid flow through the valve 87. The shear pin 53 being knocked out of the way, the valve plug 51 is free to be forced inward by fluid pressure applied to drilling mud in the annulus 30 through the valve opening 56 into the splined cup 44 on into the by-pass sleeve 60 below the sealing rubber 76 of the plug 40, the pressure of the drilling mud forcing the plug into an upward position as shown in FIG. 8 and on into its final position near the top of drill pipe 28, pushing the fluid sample and the pump-out bar 110 ahead, the sample flowing through the outlet 22 into a container (not shown) for collection, and the pump-out bar 110 hitting the bottom of the cap 20, the resultant force pushing the anvil 86 downward, opening the valve 87 of the plug, allowing flow of drilling mud through the latter to flush out all traces of fluid sample from the apparatus prior to its removal and disassembly.

Another alternate procedure is to use only the second or top plug 42, in which situation the first or bottom plug 40 is not used. When a well bore 10 has been drilled into a formation 16 from which it is desired to obtain a fluid sample, formation testing apparatus is lowered into the borehole 10. Included in the apparatus are a perforated bull nose 38 located in the area of the formation 16, a packer 36 for sealing off the formation 16 from the remainder of the well bore 10, a main or first valve 34 for controlling or barring flow through the drill pipe 28; above valve 34 is attached the reverse-circulating sub 32, with the plug 42 immediately above it. To the top of the reverse-circulating sub 32 are attached lengths of drill pipe 28 sufficient to provide the volume of fluid sample desired. The landing sub 26 is screwed on at the top of the lengths of drill pipe, and additional lengths of drill pipe 18 added to reach above the earth's surface 12, where surface equipment is added, including a cap 20, an outlet conduit 22 and a valve 24. If cushioning water is desired above plug 42, it may be added through valve 24. With the apparatus in place, the packer 36 is set, isolating the formation 16 from the remainder of the well bore 10, the main valve 34 is opened, allowing fluid from the formation 16 to enter the bull nose 38 through the perforations 39, flow up inside the packer 36 and the valve 34 and into the reverse-circulating sub 32, flowing up around the splined cup 44 through the space 46 and around the by-pass sleeve 60 through the space 63 and the by-pass holes 64, coming into the drill pipe below the seal 96 of the plug, the latter being urged upward by fluid pressure to its position in sealing engagement with the landing sub 26 as in FIG. 5. In the event that there is insufficient formation pressure to force the plug 42 all the way up, a fishing tool (not shown) may be lowered into the pipes 18 and 28 to engage the fishing neck 118 and raise the plug into its upper position. The pipe 28 having been filled with fluid sample below the plug 42, the main valve 34 is closed, the packer 36 released, and the apparatus raised in the borehole 10, top lengths of pipe 18 being removed until the landing sub 26 is exposed above the earth's surface 12 and the rotary table 126, the remainder of the pipe 28 being supported by a set of slips 130 in the slip bowl 128 of the rotary table 126, as shown in FIGS. 6 and 7. The fishing neck 118 is removed, the retrieving assembly 134 screwed into the top of the landing sub body 27, the blanking plug 124 removed and in its place the outlet nipple 138 inserted, to which is connected the flow line 140, with its gauge 142 and valve 144, leading to a suitable sample container 146. The knockout bar 136 is then screwed through plug 132 of the retrieving assembly 134 until the valve plug 100 is pushed down below the inlet ports 106, thus opening a passage for flow of the fluid sample through the inlet ports 106 and through the inside of the plug 42 and the landing sub body 27 and through the flow line 140 to the sample container 146. On screwing the knockout bar 136 down farther, the pump-out bar 110 is ejected from the actuating sleeve 98 of the plug 42 as illustrated in FIG. 7, the pump-out bar 110 falling and striking the pin 53 to break it off at its notch 54, allowing the plug 51 to be forced inward by fluid pressure applied to drilling mud in the annulus 30, the fluid flowing in from the annulus through the valve opening 56 into the reverse-circulating sub 32, forcing the fluid sample in pipe 28 upward through the pipe and the plug 42, and out through the flow line 140 for collection in the container 146 until all the fluid sample is collected.

While one form of the apparatus has been shown by way of illustration, it should be understood that various modifications will occur to one skilled in the art. For example, referring to FIG. 6, opening of the top valve 100 and ejection of the pump-out bar 110 could be accomplished by application of fluid pressure from above instead of being done mechanically. Also, referring to FIG. 2, the by-pass of formation fluid could, by slight modification, be made through the inside of splined cup 44 and the inside of the lower plug 40; and pin 53 could be detached from valve plug 51 and attached to or made integral with the plunger head 81, to move downward as the anvil 86 is struck, allowing the valve plug 51 to be forced inward by annulus pressure, thus providing an open inlet port 56 for reverse circulation. It should be understood also that while the illustrations and descriptions have been directed primarily toward the sampling of a formation 16 at the bottom 14 of a borehole 10, the apparatus is adaptable to formations at intermediate positions in the well bore 10 by packing off with packer rubbers both above and below the formation to be sampled.

I claim:

1. A method for obtaining a sample of fluid from an earth formation traversed by a borehole extending from the surface of the earth to the formation which comprises:
    (a) establishing communication with said earth formation from the surface of the earth through a zone in said borehole spaced from and isolated from the wall of said borehole, thus forming an annular space between said zone and said wall;
    (b) establishing a barrier in said zone above said earth formation beyond which said sample may not pass;
    (c) isolating said formation from the remainder of said borehole;
    (d) establishing communication between said formation and said zone, thereby allowing flow of a sample of fluid from said formation into said zone, limited by said barrier;
    (e) isolating said sample during said flow from fluid in said zone above said sample;
    (f) barring said formation from said zone;
    (g) establishing communication between said annular space and said formation;
    (h) translating said zone containing said sample to where said barrier is exposed at said surface of the earth;
    (i) establishing communication between said annular space and a location in said zone between said sample and the point in said zone at which said sample is isolated from said formation;
    (j) isolating said sample from fluid in said annular space;
    (k) establishing communication from said zone containing said sample through said barrier;
    (l) applying pressure to said fluid in said annular space, communicating with said isolated sample in said zone, to force said sample through said zone and said barrier; and
    (m) collecting said sample.

2. A method of obtaining a sample of fluid from an earth formation traversed by a borehole extending from the surface of the earth to the formation which comprises:
    (a) establishing communication with said earth formation from the surface of the earth through a zone in said borehole spaced from and isolated from the wall of said borehole, thus forming an annular space between said zone and said wall;
    (b) isolating said formation from the remainder of said borehole;
    (c) establishing communication between said formation and said zone, thereby allowing flow of a sample of fluid from said formation into said zone;
    (d) barring said formation from said zone;
    (e) establishing communication between said annular space and a location in said zone between said sample and the point in said zone at which said sample is barred from said formation;
    (f) isolating said sample from fluid in said annular space;
    (g) applying pressure to said fluid in said annular space, communicating with said isolated sample in said zone, to translate said sample to said surface of the earth; and
    (h) collecting said sample.

3. A method for obtaining a sample of fluid from an earth formation traversed by a borehole extending from the surface of the earth to the formation which comprises:
    (a) establishing communication with said earth formation from the surface of the earth through a zone in said borehole spaced from and isolated from the wall of said borehole, thus forming an annular space between said zone and said wall;
    (b) establishing a barrier in said zone above said earth formation beyond which said sample may not pass;

(c) isolating said formation from the remainder of said borehole;
(d) establishing communication between said formation and said zone, thereby allowing flow of a sample of fluid from said formation into said zone limited by said barrier;
(e) isolating said sample during said flow from fluid in said zone above said sample;
(f) barring said formation from said zone;
(g) establishing communication between said annular space and said formation;
(h) translating said zone containing said sample to where said barrier is exposed at said surface of the earth;
(i) establishing communication between said annular space and a location in said zone between said sample and the point in said zone at which said sample is barred from said formation;
(j) isolating said annular space from the remainder of said borehole;
(k) establishing communication from said zone containing said sample through said barrier;
(l) applying pressure to said fluid in said annular space, communicating with said sample in said zone, to force said sample through said zone and said barrier; and
(m) collecting said sample.

4. Apparatus for obtaining a fluid sample from an earth formation traversed by a borehole extending from the surface of the earth to the formation comprising:
(a) a pipe extending into said borehole from said surface of the earth to a point adjacent to said formation;
(b) packer means for packing off between said pipe and said borehole above said formation;
(c) said pipe having an opening below said packer means for communication with said formation;
(d) first valve means for controlling flow of fluid into said pipe through said opening;
(e) a bottom plug in said pipe above said first valve means and movable upwardly through said pipe in response to fluid force exerted on said bottom plug from below;
(f) a top plug in said pipe above said bottom plug and movable upwardly through said pipe in response to fluid force exerted on said top plug from below;
(g) said plugs each having seal means for sealing the plug against the inner wall of said pipe as the plug moves therethrough;
(h) said seal means of said plugs being spaced longitudinally in said pipe;
(i) means for conducting fluid in said pipe from below said bottom plug into the space between said seal means for urging said top plug to move upwardly through said pipe;
(j) means for arresting upward movement of said top plug at a selected position in said pipe;
(k) valve controlled means for conducting fluid from outside of said pipe and above said packer means into said pipe below said bottom plug and above said first valve means for urging said bottom plug to move upwardly through said pipe; and
(l) valve controlled fluid outlet means for withdrawing fluid from between said plugs when said top plug is in said arresting means.

5. Apparatus for obtaining a fluid sample from an earth formation traversed by a borehole extending from the surface of the earth to the formation comprising:
(a) a pipe extending into said borehole from said surface of the earth to a point adjacent to said formation;
(b) packer means for packing off between said pipe and said borehole above said formation;
(c) said pipe having an opening below said packer means for communication with said formation;
(d) first valve means for controlling flow of fluid into said pipe through said opening;
(e) a plug in said pipe above said first valve means and movable upwardly through said pipe in response to fluid force exerted on said plug from below;
(f) said plug having seal means for sealing it against the inner wall of said pipe as said plug moves therethrough;
(g) means for conducting fluid in said pipe from below said plug into the pipe above said plug;
(h) valve controlled means for conducting fluid from outside of said pipe and above said packer into said pipe below said plug and above said first valve means for urging said plug to move upwardly through said pipe; and
(i) means for withdrawing fluid in said pipe above said plug.

6. Apparatus for obtaining a fluid sample from an earth formation traversed by a borehole extending from the surface of the earth to the formation comprising:
(a) a pipe extending into said borehole from said surface of the earth to a point adjacent to said formation;
(b) packer means for packing off between said pipe and said borehole above said formation;
(c) said pipe having an opening below said packer means for communication with said formation;
(d) first valve means for controlling flow of fluid into said pipe through said opening;
(e) a plug in said pipe above said first valve means and movable upwardly in said pipe in sealing relation thereto in response to fluid force exerted on said plug from below by fluid flowing into said pipe through said opening;
(f) means for arresting upward movement of said plug at a selected position in said pipe;
(g) valve controlled means for conducting fluid from outside of said pipe and above said packer into said pipe above said first valve means and below a column of fluid in said pipe beneath said plug; and
(h) valve controlled outlet means for withdrawing fluid from said pipe below said plug when said plug is in said arresting means.

7. Apparatus for obtaining a fluid sample from an earth formation traversed by a borehole extending from the surface of the earth to the formation comprising:
(a) a pipe extending into said borehole to a point adjacent to said formation from said surface of the earth, thus forming an annular space between said pipe and said borehole;
(b) said pipe having a first opening adjacent said formation for communicating with said formation;
(c) packer means for packing off between said pipe and said borehole above said first opening and said formation;
(d) first valve means for controlling flow of fluid into said pipe through said first opening;
(e) a bottom plug in said pipe above said first valve means and movable upwardly through said pipe in response to fluid force exerted on said bottom plug from below;
(f) a top plug in said pipe above said bottom plug and movable upwardly through said pipe in response to fluid force exerted on said top plug from below;
(g) said plugs each having sealing means for sealing the plug against the inner wall of said pipe as the plug moves therethrough;
(h) said seal means being spaced longitudinally in said pipe;
(i) means for conducting fluid in said pipe from below said bottom plug into the space between said respective seal means;
(j) valve controlled means for conducting fluid from outside of said pipe and above said packer into said pipe below said bottom plug and above said first valve means;

(k) arresting means for arresting upward movement of said top plug at a selected position in said pipe;

(l) valve controlled means for conducting fluid through said arresting means to outside of said pipe; and (m) means including a valve in said top plug for withdrawing fluid in said pipe from between said plugs when said top plug is in said arresting means.

References Cited
UNITED STATES PATENTS

| | | | |
|---|---|---|---|
| 2,978,046 | 4/1961 | True | 166—3 |
| 3,096,823 | 7/1963 | Crowe | 166—152 |
| 3,100,537 | 8/1963 | Crowe | 166—226 |
| 3,111,169 | 11/1963 | Hyde | 166—145 |
| 3,190,360 | 6/1965 | Farley | 166—226 |

JAMES A. LEPPINK, *Primary Examiner.*